Feb. 13, 1962  F. T. POTTER  3,020,671
INSECT TRAP
Filed April 6, 1960  2 Sheets-Sheet 1
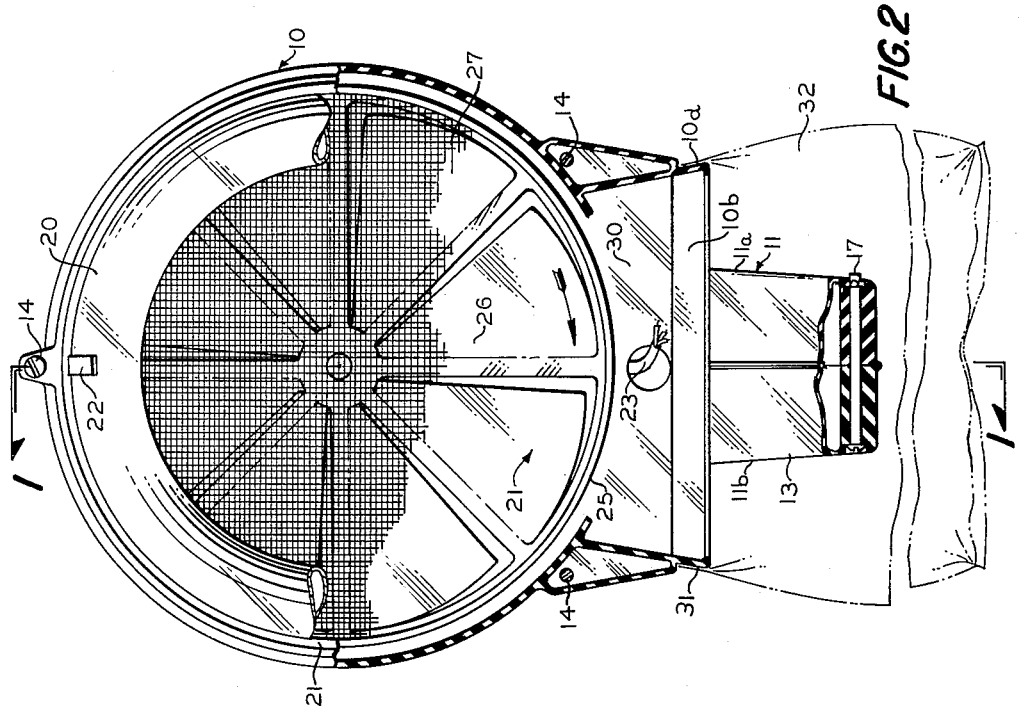
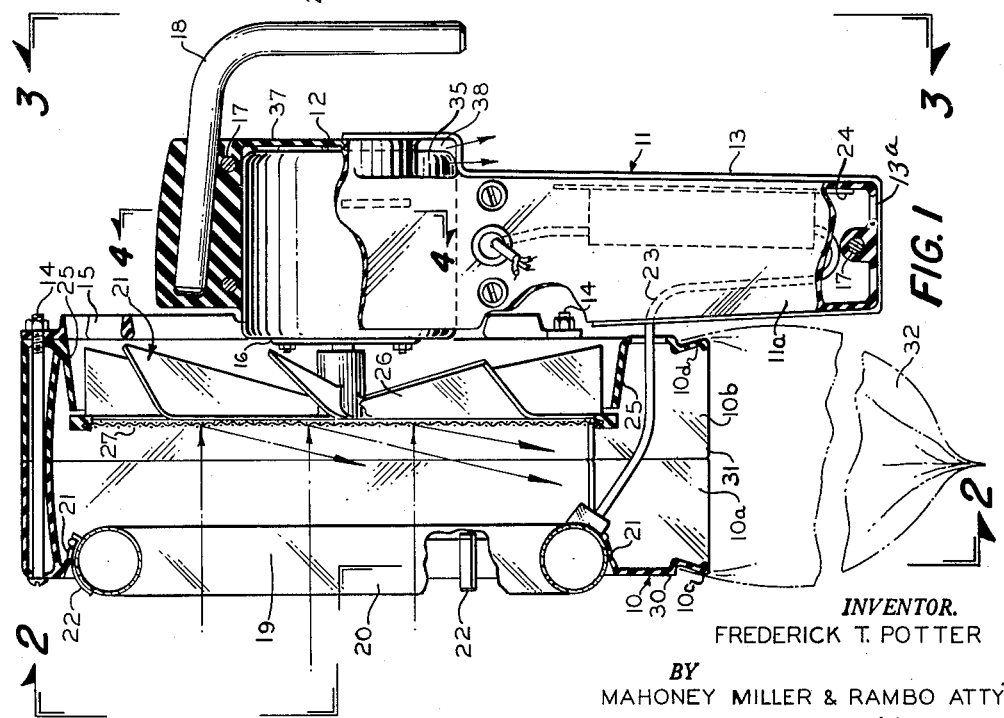
INVENTOR.
FREDERICK T. POTTER
BY
MAHONEY MILLER & RAMBO ATTY'S
BY Wm. V. Miller Feb. 13, 1962   F. T. POTTER   3,020,671
INSECT TRAP
Filed April 6, 1960   2 Sheets-Sheet 2
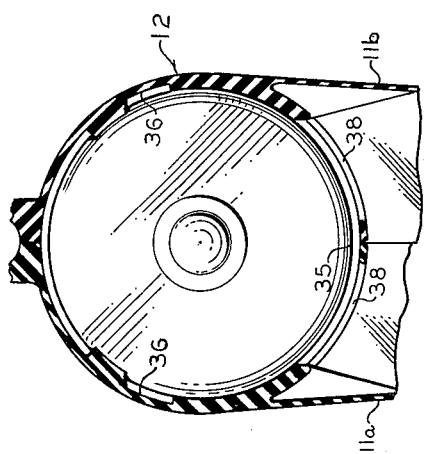
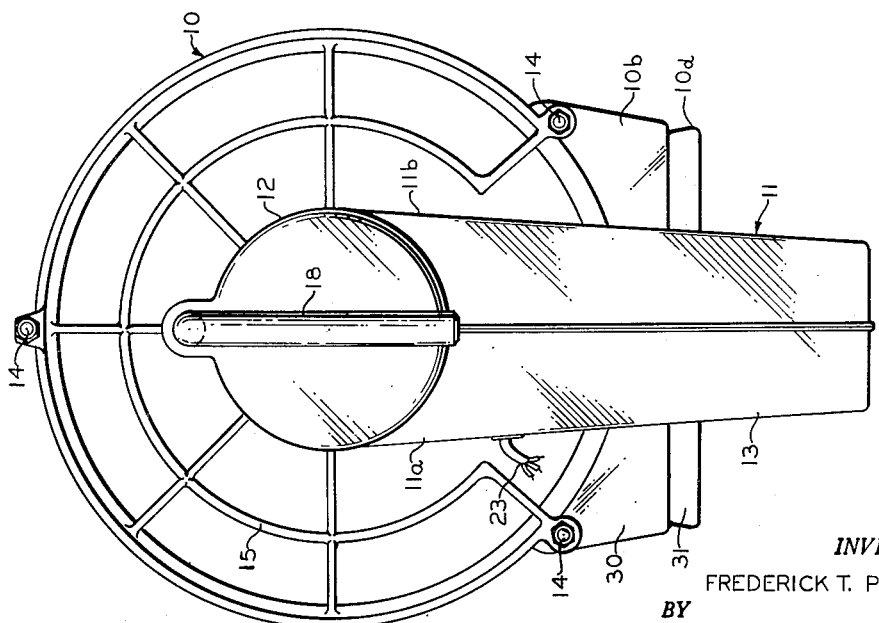
INVENTOR.
FREDERICK T. POTTER
BY
MAHONEY MILLER & RAMBO ATTY'S.

United States Patent Office 3,020,671
Patented Feb. 13, 1962

3,020,671
INSECT TRAP
Frederick T. Potter, Columbus, Ohio, assignor to Ampsco Corporation, Columbus, Ohio a corporation of Ohio
Filed Apr. 6, 1960, Ser. No. 20,289
2 Claims. (Cl. 43—139)

This invention relates to an insect trap. It relates, more particularly, to a trap for attracting and catching winged insects. More specifically, it relates to the general type of insect trap which employs a source of light, such as near-ultraviolet light, to attract the insects to the vicinity of the trap and a suction fan for drawing them into the trap.

This general type of insect trap has had some popularity in recent years. However, the traps of this general nature which have been used up to the present type have been of cumbersome and complicated structure and have been relatively expensive as well as difficult to handle. However, even more of a disadvantage with these prior art insect traps has been the fact that they are so constructed that they have not been self-cleaning and it is obvious that since thousands of insects are drawn into the trap, the cleaning of the trap becomes an unpleasant task which must be performed quite frequently or the trap will become ineffective.

It is one of the objects of this invention to provide an insect trap of the general type indicated which includes a source of near-ultraviolet light for attracting the insects to the trap and a suction fan for drawing them into the trap which is so designed and constructed that it is of a very neat and compact structure which is of pleasing appearance, easy to handle, and inexpensive to manufacture, but which is still completely effective for attracting and trapping night flying insects.

Another object of this invention is to provide a trap of the general type indicated which is so designed and constructed that it is self-cleaning, being of such a nature that it will draw the insects into the trap and dispose of them by throwing them with considerable force into a disposable container usually without smashing the insects on portions of the trap.

Various other objects will be apparent.

In the accompanying drawings, the preferred embodiment of this invention is illustrated but it is to be understood that specific details of structure may be varied without departing from basic principles of this invention.

In the drawings:

FIGURE 1 is an axial vertical sectional view taken through the insect trap of this invention along line 1—1 of FIGURE 2.

FIGURE 2 is a front elevational view, partly broken away, of the insect trap taken along line 2—2 of FIGURE 1.

FIGURE 3 is a rear elevational view of the insect trap taken along line 3—3 of FIGURE 1.

FIGURE 4 is a transverse vertical sectional view taken along line 4—4 of FIGURE 1.

With reference to the drawings, the insect trap of this invention is illustrated as comprising a housing which is preferably made of suitable plastic material. The housing is preferably made in sections to facilitate molding. The housing includes a forward light and fan housing portion 10 which is of annular form and a rear housing portion 11 which is shaped to provide an upper motor housing portion 12 of annular form which is coaxial with the portion 10 and a depending radial ballast housing portion 13. The housing portion 10 is made of two half-sections 10a and 10b, each of which is of annular form and they are disposed in tandem relationship, being normally secured in cooperative relationship by the bolts 14. At the rear of the section 10b is a grill or spider 15 and this has a central ring 16 which is bolted to the front face of the motor housing portion 12.

The housing portion 11 is also made of half-sections 11a and 11b which are disposed side-by-side and are normally secured in cooperative relationship by the bolts 17. Non-rotatably clamped between the sections 11a and 11b at the upper ends thereof is the inner and upper end of a hook 18 by means of which the entire trap can be suspended from a suitable support.

Within the housing portion 10 and disposed in coaxial tandem relationship is an annular light tube 20 and a combination fan and screen unit 21. The light tube 20 is of a suitable standard type, preferably a fluorescent tube, for producing near-ultraviolet light which attracts the insects. It will be noted that the tube 20 is supported at the forward edge of the housing portion 10 and provides within it an inlet 19 leading into such housing portion.

To support the bulb 20, the housing section 10a is provided with an annular support flange 21 and associated with this flange at angularly spaced intervals therearound are spring clips 22. In positioning or removing the tube 20, these clips can be spread to permit mounting of the tube on the flange 21 or removal therefrom. The tube is connected by the usual plug and wiring 23 to control mechanism such as the ballast or transformer 24 in the depending portion 13 of the housing.

The fan and screen unit 21 is disposed within the rear section 10b of the housing portion 10. It is disposed within an annular flange or shroud 25 formed within the section 10b. It is preferably made of plastic and includes the blades 26 which are angled so that when the fan is rotated clockwise as indicated by the arrow in FIGURE 2, it serves as a suction fan to draw insects to and through the inlet 19. At the front edges of the blades 26, a disc-like plastic screen member 27 is heat welded to the fan for rotation therewith. Thus, the fan and screen are assembled as a unit and rotate as a unit.

The housing sections 10a and 10b are provided with radial extensions 10c and 10d which will be arranged to cooperate to provide a dependent discharge chute 30 which leads radially downwardly from the housing portion 10. These sections also provide a mouth portion 31 on the chute against which the mouth of a disposable flexible bag or other container 32 can be clamped.

The fan and screen unit 21 is keyed on the forward projecting end of the drive shaft of an electric motor 35 which is mounted in the motor housing portion 12. As shown in FIGURES 1 and 4, the motor housing portion has grooves 36 formed on its interior wall surface thereof which provide passageways through which air may pass around the motor to cool it. The rear end of the motor housing portion is closed by a wall 37 but the air will pass downwardly along such wall and will reach the discharge openings 38 at the lower side of the housing portion 12. Thus, the fan unit 21 will supply cooling air for the motor 35 which will be circulated therearound. Also, the lower end of the depending housing portion 13 is provided with ventilating openings 13a through which air may pass upwardly into the housing.

In operation, the light tube 20 will be illuminated and the fan and screen unit 21 will be driven by the motor 35. The trap will be suspended by the hook 18 from a suitable support and since the transformer or ballast 24 in the housing portion 13 is of considerable weight, this will keep the trap suspended with the housing portion 13 and the bag 32 dependent.

The insects will be attracted by the light tube 20, especially at night, and will be drawn through the inlet 19 into the housing portion 10 by the fan and screen unit 21. The insects will be pulled into contact with the disc-like screen 27 and will be thrown off by centrifugal force into contact with the annular wall of the housing portion 10 and will fall and be forced out through the discharge chute 30 into the disposable bag 32.

With this trap, there will be no serious cleaning problem because the insects are merely drawn into contact with the screen and immediately thrown off by centrifugal force. The insects do not contact the fan blades and are not smashed thereby. In the usual prior art trap, they are drawn through the fan and discharged onto a baffle or screen with considerable force where their smashed bodies tend to collect and reduce the air flow as well as to accumulate on the fan itself. The trap is so designed that it is a small compact unit easy to handle and economical to produce.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An insect trap comprising a housing having an axially disposed annular inlet at the front side thereof and an outlet at the rear side thereof, an annular light tube disposed at said inlet coaxial therewith so as to attract insects to said inlet, a combination fan and screen unit mounted within the housing and spaced axially therewithin rearwardly from said inlet, said fan and screen unit comprising suction blades for drawing air and insects through the inlet and a face screen carried by the suction blades on the inlet side thereof with which the insects drawn through said inlet will contact before contacting said blades and will be thrown radially outwardly therefrom by centrifugal force, air duct means extending from said rear side of said housing to closely adjacent said face screen for substantially preventing recirculation of air within said housing, a discharge outlet portion leading radially from said housing at a location between said inlet and the face of the screen so that insects contacting said screen and thrown radially therefrom will pass through said discharge outlet portion, said discharge outlet portion having an outlet mouth, and a flexible bag having a mouth mounted on said outlet mouth, rotation of said screen overcoming the suction of the rotating fan to throw the insects contacting with the screen with considerable force outwardly into said bag and overcoming the suction of the fan to expand the bag to receive the insects, rotation of said screen also preventing return of insects back through said outlet mouth from the expanded bag.

2. An insect trap according to claim 1 including means for removably supporting the light tube within said inlet, said means comprising an annular support flange within the inlet in coaxial position therein for receiving and supporting the light tube, and tube-engaging spring clips disposed at angular spaced intervals around said flange for receiving and retaining said light tube.

References Cited in the file of this patent
UNITED STATES PATENTS

| 1,037,659 | Rembert | Sept. 3, 1912 |
| 2,780,026 | Dail et al. | Feb. 5, 1957 |